INVENTORS
W. R. EDDY
D. L. McKAY
BY *Hudson and Young*
ATTORNEYS

United States Patent Office

2,890,962
Patented June 16, 1959

2,890,962

PROCESS AND APPARATUS FOR PURIFICATION OF CRYSTALS

William R. Eddy and Dwight L. McKay, Bartlesville, Okla., assignors to Phillips Petroleum Company, a corporation of Delaware Application November 14, 1955, Serial No. 546,732

9 Claims. (Cl. 99—205)

This invention relates to an improved process for the resolution of mixtures by crystal purification; and in one aspect, it relates to an improved apparatus for crystal purification.

Purification by means of fractional crystallation has been known for a number of years. Schmidt, Reissue 23,810 (1954) discloses a process and apparatus for purifying crystals, which process involves moving a mixture of crystals and adhering liquid through a liquid removal zone, a reflux zone and a melting zone, removing liquid in said liquid removal zone, melting crystals in said melting zone, withdrawing part of the melt as product, and forcing another part of the melt in a direction countercurrent to the movement of crystals in said reflux zone. This process is generally applicable to the separation of at least one pure component from any mixture which is resolvable into its components by fractional crystallization. For example, the process can be used for the concentration of fruit juices, vegetable juices and other materials which comprise aqueous solutions which can be concentrated by the formation and removal of ice crystals. The process is also of great value in the resolution of non-aqueous mixtures, one example of such an application being the separation of para-xylene from a mixture thereof with the other xylene isomers and ethyl benzene; and another example being the separation of methyl vinylpyridine from mixtures of same with methyl ethylpyridine.

The purity of the product from a crystal purification process as above described is governed by the effectiveness of the reflux which passes in countercurrent relationship to the passage of the crystal mass. The maximum rate of flow of reflux is principally governed by the ability of the reflux material to flow through the crystal bed without channeling and without eroding the crystal bed. The reflux material, which is a melt of purified crystals, should pass through the crystal bed and, as a result of contact with the cold crystals, freeze, and in freezing displace occluded mother liquid in a direction countercurrent to the movement of crystals through the melting zone.

Various attempts have been made to melt the crystal bed by reintroduction of hot melt to the crystal melting section so as to avoid the high skin temperature of heating elements which are in direct heat relationship with the crystal bed so as to provde a sufficient quantity of heat to melt the required amount of crystals for adequate reflux. The problem which has accompanied the use of crystal melt as a heating means is the channeling and erosion of the crystal bed resulting from the high velocity of the flow of crystal melt.

The present invention provides a process and an apparatus for effecting a separation of the type described at higher throughput rates, improved stability and ease of operation, and improved heat distribution by a novel means for providing a high rate of reintroduction of hot melt to the crystal melting zone. In addition, products of high purity are obtainable over long periods of operation because substantial uniformity of crystal concentration in the crystal bed can be maintained throughout the operating period of the process. According to the present invention hot crystal melt is reintroduced into the crystal bed through a permeable member which is capable of delivering a large amount of crystal melt at low velocity and with uniform distribution with respect to the surface of the crystal bed exposed thereto.

Further, in accordance with this invention, in a process wherein solids are countercurrently contacted with the liquid in a purification zone, the solids are supplied continuously to said zone and the liquid is supplied continuously and distributed uniformly throughout the solids.

Also in accordance with this invention, there is provided, in an apparatus comprising a purification chamber, liquid-solid separation means in said chamber, melting means positioned in one end of said chamber, means for moving solids to said separation means and thence toward said melting means, means for removing melt from said chamber, and means for removing liquid from said separation means, the improvement which comprises means for returning a portion of said melt through said melting means evenly distributed over the surface of said melting means and into contact with said solids and means provided in said melting means for flow of melt from said bed to said means for removing melt from said chamber.

According to one embodiment of the invention, a mass of crystals to be purified, together with accompanying liquid, is passed into a purification chamber containing a filter which is coextensive with the wall of said chamber and positioned at an intermediate part thereof, then through a reflux zone toward a heating means positioned in the downstream end, with respect to flow of crystals through the chamber, which heating means comprises a double walled member with the side toward the crystal bed being made of porous, sintered metal, and the other wall being made of nonporous metal, said heating means containing a plurality of ducts extending through both walls of the double walled member. The melt is withdrawn, in part, as purified product, and forced, in part, into the interior of the double walled heating member so as to flow through the porous sintered metal wall of the heating member, and melt the approaching crystal bed uniformly across its longitudinal axis. Thus, according to this invention, as the crystals are supplied to the purification zone, the reflux or crystal melt is caused to flow uniformly into the moving bed of crystals from the opposite direction and to melt the crystals of said moving bed at a high rate without erosion or channeling.

The invention is equally applicable to the various types of purification columns such as the piston type purification column as exemplified by Schmidt, Reissue 23,810 (1954), the pulse type column as disclosed and claimed in application Serial No. 494,866, filed March 17, 1955, by R. W. Thomas, the pulse type column disclosed and claimed in application Serial No. 546,101, filed November 10, 1955, by P. S. Stallings, Jr., and the agitated type column disclosed and claimed in application Serial No. 375,850, filed August 24, 1953.

An important feature of the invention lies in the fact that materials which are heat sensitive such as dimethyl phthalates can be successfully purified without danger of decomposition which would otherwise result from the high skin temperatures necessary with the use of conventional heaters.

The drawing illustrates a preferred embodiment of this invention and it is to be understood that conventional equipment such as pumps, etc., and conventional fittings such as valves, and conventional control instruments such as temperature and pressure control instruments, are not shown but will readily be supplied by those skilled in the art:

Corresponding numerals indicate corresponding parts in each of the three figures.

Figure 1:
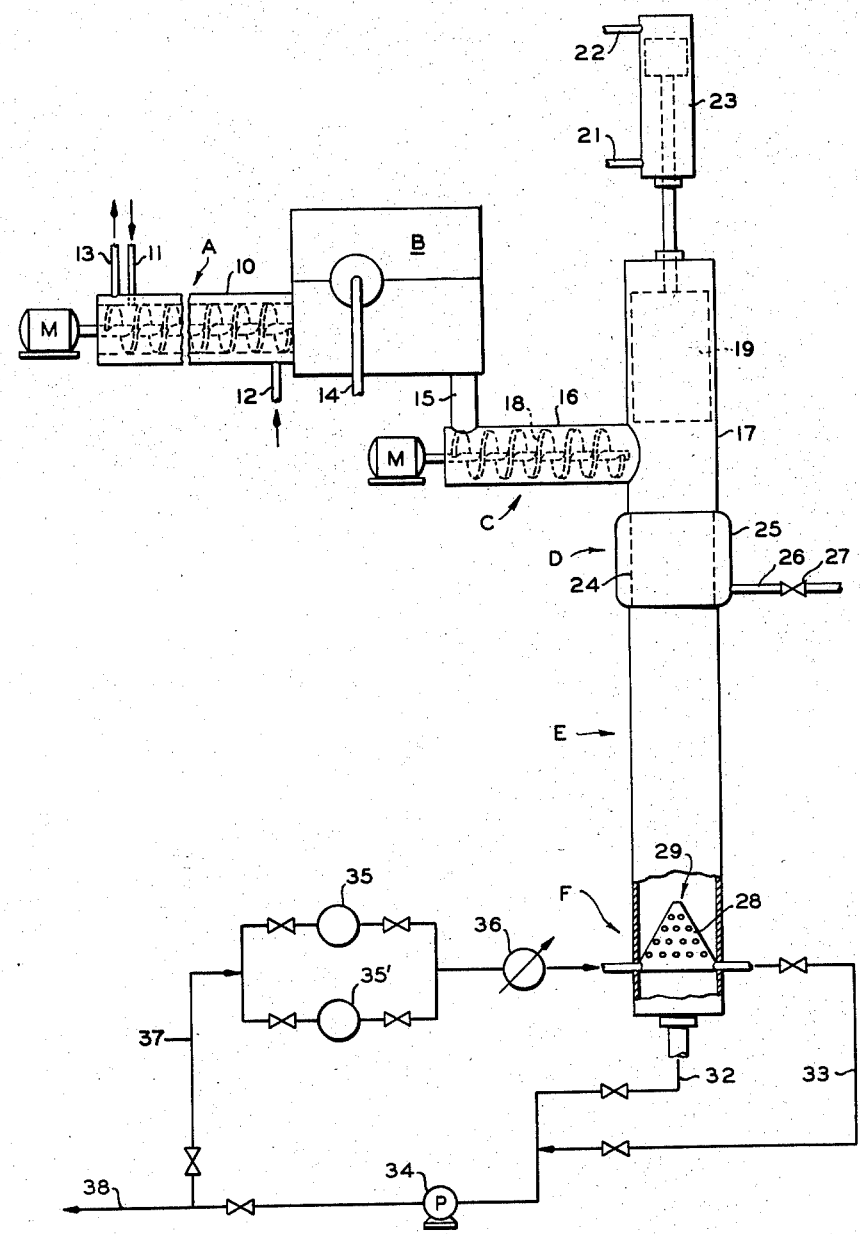
Figure 1 is an elevational view, partly in section, of fractional crystallization apparatus illustrating the present invention.

The apparatus of Figure 1 comprises freezing or crystallizing means A, a filtering means B, conveyor zone C, a second filtering means D, a reflux zone E, and a melting zone F.

A feed stream comprising, for example, a mixture of dimethyl phthalates is introduced to chiller 10 by means of line 11. Chiller 10 can be a conventional scraped surface chiller comprising an inner and outer cylinder spaced apart so as to form an annular space therebetween for circulation of a refrigerant which can be admitted through line 12 and removed through line 13. The chiller is operated at a temperature which will freeze at least a portion of the component to be separated from the mixture. The resulting slurry of crystals and mother liquor is passed from the chilling section to the filtering means B which can be a conventional rotary filter. Mother liquor is removed from the filter and discarded from the system through line 14 and the crystals passed through conduit 15 to conveyor 16 and are introduced into crystal purification column 17 by suitable means such as by the action of screw conveyor 18. Other means such as a piston can also be utilized.

The crystals are compacted and moved toward the melting section F of column 17 by means of piston 19 which is actuated by flow of fluid in lines 21 and 22 to cylinder 23. Mother liquor is removed from filtering section D which can be perforated section 24 of column 17 enclosed by a bustle ring 25. Mother liquor is passed by means of line 26 and controlled by valve 27 to a reprocessing step. The mother liquor can be returned to feed line 11 and thus recycled to the process.

As the mass of crystals is moved toward the melting zone F a flow of hot crystal melt is forced through the porous or perforate metal surface 28 of heater 29. A portion of the crystal melt is refrozen in the crystal mass and the remaining crystal melt is returned through heating means 29 by way of the passage ways 31 to the bottom of column 17. Crystal melt is withdrawn from the bottom of the column 17 through line 32. The crystal melt in line 32 is pumped by means of pump 34 through filters 35 and 35' and heater 36 and thus returned to heating means 29. A predetermined portion of the crystal melt is withdrawn through line 38 as the product of the process.

The valves of line 33 are normally closed. This line is utilized to increase the flow of hot liquid through the heater 29 when additional heating is required.

Filters 35 and 35' are advantageously operated alternately; one being in use while the other is being recharged. The filters guard against passage of solids which would plug the pores of the porous metal.

Figure 2:
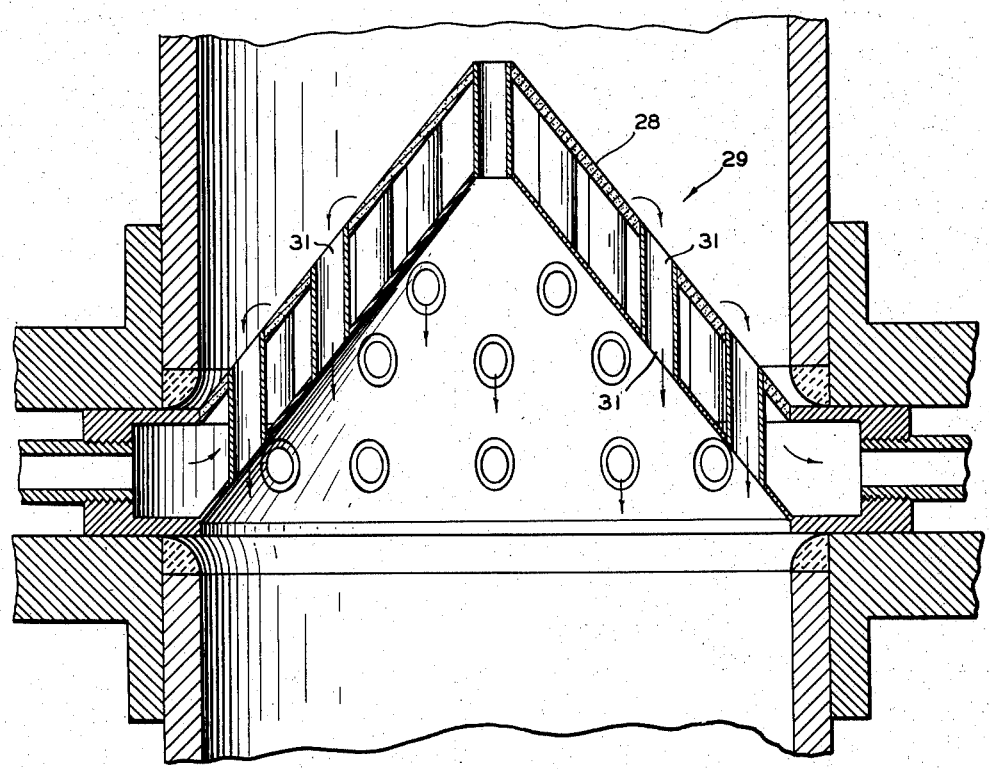
Figure 2 is a cross-sectional illustration of the novel heating element of this invention.

Figure 2 shows the details of the heating means 29.

Figure 3:
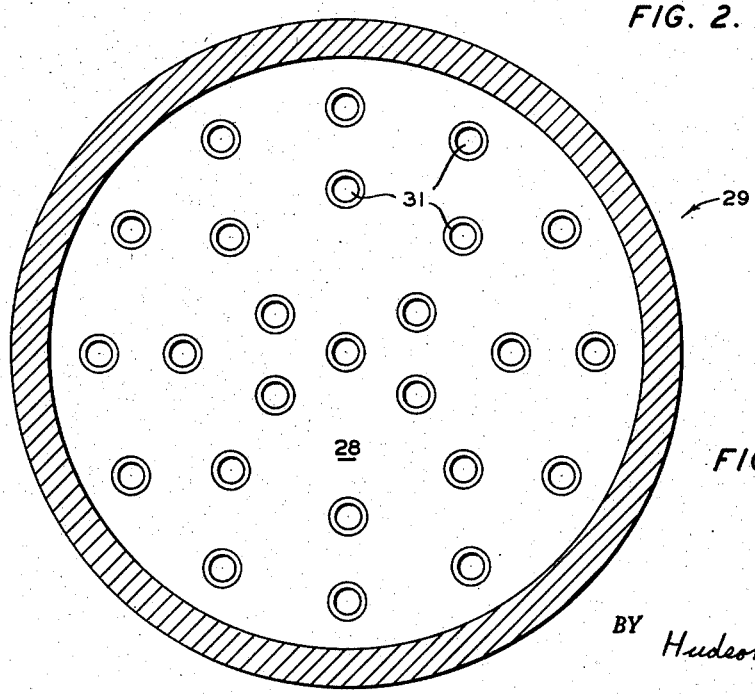
Figure 3 is a plan view of the heating element of Figure 2.

Figure 3 shows a plan view of the heating means 29.

The heater 29 is shown as a double walled cone, however, the heater can be a flat plate, an inverted cone, a concave or convex segment of a sphere, or any other configuration wherein the heater occupies substantially the entire cross-section of the column with passage ways provided for flow of crystal melt and with the porous wall of the heater in contact with, or facing, the crystal bed.

Porous metal is usually prepared by forming powdered metal into the desired shape and heating it to just below the melting point of the metal. The pore size is determined by the particle size of the metal powder. The pore size can vary within a wide range of sizes; however, it is usually preferred to employ a pore size in the range of 10 to 165 microns. The thickness of the porous metal wall can also vary within a wide range and the thickness is usually in the range of 1/16 to 1/8 inch.

The method and apparatus of this invention can be advantageously utilized in practically any system to which fractional crystallization is applicable. This invention is applicable to separations in many multi-component systems, the components of which have practically the same boiling point and are, therefore, difficult to separate by fractional distillation, or to mixtures which have diverse boiling points but which form azeotropes or are heat sensitive. The effective separation of components of such mixtures may be made from systems where the concentration of one component is relatively high, or where the concentrations of the components are about equal. One particular advantageous application of the process lies in the purification of a component of, say 15 to 25 percent purity, so as to effect a purity upwards of 98 percent. In order to illustrate some of the systems to which the invention is applicable, the following compounds are grouped with respect to their boiling points.

| Group A | B.P., °C. | F.P., °C. |
| --- | --- | --- |
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B.P., °C. | F.P., °C. |
| --- | --- | --- |
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B.P., °C. | F.P., °C. |
| --- | --- | --- |
| Toluene | 110.8 | −95 |
| Methylcyclohexane | 100.3 | −126.3 |
| 2,2,3,3-Tetramethyl butane | 106.8 | 104 |
| 2,5-Dimenthylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B.P., °C. | F.P., °C. |
| --- | --- | --- |
| Aniline | 184.4 | −6.2 |
| Toluene | 110.8 | −95 |
| Benzene | 80.0 | 5.5 |

| Group E | B.P., °C. | F.P., °C. |
| --- | --- | --- |
| Carbon Tetrachloride | 77 | −22.8 |
| Chloroform | 61 | −63.5 |
| CS$_2$ | 46.3 | −108.6 |
| Acetone | 56.5 | −95 |

| Group F | B.P., °C. | F.P., °C. |
|---|---|---|
| Ortho-xylene | 144 | −27.1 |
| Meta-xylene | 138.8 | −47.4 |
| Para-xylene | 138.5 | 13.2 |

| Group G | B.P., °C. | F.P., °C. |
|---|---|---|
| Ortho-cymene | 175.0 | −73.5 |
| Meta-cymene | 175.7 | <−25 |
| Para-cymene | 176.0 | −73.5 |

| Group H | B.P., °C. | F.P., °C. |
|---|---|---|
| Dimethyl phthalate | 282 | 5.5 |
| Dimethyl isophthalate | 124 (12 mm.) | 67 |
| Dimethyl terephthalate | 288 | 140.6 |

| Group I | B.P., °C. | F.P., °C. |
|---|---|---|
| Ortho-nitrotoluene | 222.3 | α−10.6 β−4.1 |
| Meta-nitrotoluene | 231 | 15.5 |
| Para-nitrotoluene | 238 | 51.3 |

Systems consisting of any combination of two or more of the components within any one of the groups may be separated by the process of the invention, as well as systems made up of components selected from different groups; for example, benzene may be separated from a benzene, n-hexane or n-heptane system in which the benzene is present in an amount greater that the eutectic concentration. In the same manner, para-xylene may be readily separated from a mixture of para- and meta-xylenes or from para-, meta-, and ortho-xylenes. Benzene may also be separated from admixture with toluene and/or aniline. Multi-component systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes.

This invention can also be utilized to purify naphthalene, hydroquinone (1,4-benzenediol), para-cresol, para-dichlorobenzene, and such materials as high melting waxes, fatty acids, and high molecular weight normal paraffins. The system can also be used to separate anthracene, phenanthrene, and carbazole. Furthermore, the system can be used to separate durene (1,2,4,5-tetramethylbenzene) from $C_{10}$ aromatics. In cases where the material to be purified has a relatively high crystallization point, the impure material is heated to a temperature at which only a portion of the constituents are in a crystalline state and the resulting slurry is handled at such a temperature that operation is as described in connection with materials which crystallize at lower temperatures.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

A better understanding of the invention can be obtained by reference to the following example which is intended to exemplify but not unduly restrict my invention.

*Example*

A feed mixture comprising 17.0 weight percent para-xylene, 17.5 weight percent ortho-xylene, 33.4 weight percent meta-xylene, 27.5 weight percent ethyl benzene and 4.6 percent toluene is supplied to the cooling zone A at the rate of 857 gallons per hour. Liquid material recovered from column 17 through separation means 25 and line 26 contains about 40 weight percent para-xylene. This stream is also supplied to the cooling zone at a rate of 128 gallons per hour so that the total feed to the cooling zone is 985 gallons per hour. That material is cooled to a temperature of −70° C. with the resultant formation of about 15 weight percent solids. The slurry of mother liquor and crystals is passed to the filtering zone B and 769 gallons per hour of first stage mother liquor containing about 6 weight percent para-xylene is removed from the filtering zone through line 14. The crystals recovered from the filtering zone comprise the feed to the crystal purification column 17 and are introduced into the purification column in the form of a slurry of crystals and mother liquor resulting from melting the crystals at about 1° C. and cooling the resultant melt to about −10° C. The feed to column 17 is 216 gallons per hour of a slurry containing 40 weight percent solids.

Compacting piston 19 is operated by a conventional power source such as a hydraulic piston and cylinder so as to move the crystal mass through crystal purification column 17 toward the heating means 29 in melting zone F. Heat is added to the melting zone F in the end portion of the purification column by reintroduction of hot crystal melt to heating means 29 as hereinafter described so as to maintain the desired product rate. Second stage mother liquor is withdrawn from the column through separation means 25 and line 26 at the rate of 128 gallons per hour and at a temperature of about −10° C.

Crystal melt is removed from purification column 17 through line 32 and product is taken through line 38 at the rate of 88 gallons per hour and a temperature of about 27° C. containing about 99 weight percent para-xylene. The crystal melt not removed as product is returned to heating means 29 through line 37 after it is heated to about 140° C. by means of heater 36. This hot melt is forced through the porous wall of heating means 29 into contact with the advancing crystal mass so as to provide the required amount of melting necessary to produce the reflux and the purified crystal product.

Variations and modifications are possible within the scope of the disclosure of the invention, the essence of which is the method of providing heat to the melting zone of a crystal purification column for melting the crystal bed which comprises passing hot crystal melt to said melting zone through a porous member so that a large volume of liquid is supplied at a low velocity and a device for accomplishing the method.

That which is claimed is:

1. In apparatus wherein means are provided to move crystals toward a melting section of an elongated crystal purification chamber having a crystal inlet, a mother liquor outlet, a melting section and a purified crystal melt outlet, the improvement comprising means for heating a portion of melt removed from said melt outlet; pervious walled means positioned in said melting section for passing heated melt uniformly into contact with substantially the entire cross-sectional area of said crystals in said chamber; and means for passing heated melt from said melt heating means to said pervious walled means.

2. Apparatus according to claim 1 wherein said pervious walled means comprises a double-walled cone occupying substantially the cross-sectional area of said elongated chamber with the upstream wall, with respect to the flow of crystals, pervious and the downstream wall impervious to the flow of melt and having a plurality of passage ways communicating with the upstream and downstream portions of said chamber with respect to the movement of crystals therethrough.

3. Apparatus according to claim 1 wherein said pervious walled means comprises a double-walled member occupying substantially the cross-sectional area of said elongated chamber with the upstream wall, with respect to the flow of crystals, pervious and the downstream wall impervious to the flow of melt and having a plurality of passage ways therethrough in communication with the upstream and downstream portions of said elongated chamber with respect to the flow of crystals.

4. In apparatus wherein means are provided so as to move crystals toward a heated section of an elongated crystal purification chamber having a crystal inlet, a mother liquor outlet, a heated section, and a purified crystal melt outlet, the improvement comprising means for introducing heat carrying fluid comprising hot crystal melt into the heated section of the purification column and into contact with the crystals therein in a volume sufficient to provide heat for melting said crystals and at a velocity less than that required to erode the crystal bed; and means to distribute the heat carrying fluid substantially uniformly across the cross-section of the crystal bed.

5. In the purification of crystals wherein crystals are moved through a purification zone into a melting zone in countercurrent flow relationship to crystal melt, the improvement comprising the steps of injecting a heat-carrying fluid comprising hot crystal melt into said melting zone as a plurality of streams distributed uniformly across substantially the entire cross-section of the melting zone, in a quantity sufficient to melt said crystals and at a velocity less than that required to erode said crystals; and moving said crystals into contact with said heat-carrying fluid.

6. In an apparatus for the purification of crystals comprising a purification chamber, liquid-solid separation means in said chamber, pervious melting means positioned in one end of said chamber, means for moving solids to said separation means and thence toward said melting means, means for removing liquid from said separation means, and means for removing melt from said chamber, the improvement which comprises means for heating and returning a portion of said melt through said pervious melting means evenly distributed substantially throughout the cross-section of said purification chamber and into contact with said solids; and means provided through said melting means for flow of melt from said bed to said means for removing melt from said chamber.

7. In the purification of crystals wherein crystals are moved through a purification zone into a melting zone in countercurrent flow relationship to crystal melt, the improvement comprising the steps of removing a portion of said crystal melt; heating said melt to a temperature above the melting point of said crystals; and introducing said heated melt to said melting zone as a plurality of streams distributed uniformly across substantially the entire cross-section of said melting zone, in an amount sufficient to melt said crystals and at a velocity less than that required to erode the crystals.

8. An apparatus for the purification of crystals comprising an elongated conduit, closed at both ends and having feed inlet means for introducing crystals and mother liquor at a first end and means for removing crystal melt from the second end; liquid pervious, crystal impervious filter means communicating between the exterior of said conduit and the interior of said conduit at a point intermediate the feed inlet means and the melt removing means; heating means positioned intermediate the filter means and melt removal means comprising a double-walled member occupying substantially the entire cross-sectional area of said conduit having the wall facing the filter means pervious to liquid and the opposite wall impervious to liquid, said double-walled member having a plurality of passageways therethrough in communication with the upstream and downstream positions of said conduit with respect to the flow of crystals; means for heating a portion of melt removed; and means for introducing heated melt to said double-walled member.

9. An apparatus for the separation and purification of at least one component of a liquid mixture which comprises means for chilling said mixture so as to form crystals of at least one component; a first filter means for removing mother liquor from the chilled mixture; an elongated conduit, closed at each end, having a first crystal melt outlet at one end and means at the other end for moving crystals toward said outlet; means for introducing crystals from said first filter means to said conduit at a point downstream from said crystal moving means with respect to the flow of crystals; a second filter means communicating between the exterior of said conduit and the interior of said conduit at a point downstream from said crystal introducing means; heating means positioned downstream from said second filter means comprising a double-walled member occupying substantially the entire cross-sectional area of said conduit, having the upstream wall pervious to crystal melt, and having a plurality of passageways therethrough communicating with the upstream and downstream portions of said conduit; melt inlet and second melt outlet means in said heating means; means for removing melt from said first melt outlet means and recovering a first portion of said melt as product of the process; means for heating the second portion of said melt and introducing same to said melt inlet; and means for removing melt from said second outlet and returning same to said means for heating said second portion of said melt.

References Cited in the file of this patent
UNITED STATES PATENTS

| | | |
|---|---|---|
| 2,747,001 | Weedman | May 22, 1956 |
| 2,765,921 | Green | Oct. 9, 1956 |
| 2,780,663 | Gunness | Feb. 5, 1957 |